July 4, 1939.  E. HERING  2,165,051
FLEXIBLE PIPE JOINT
Filed Nov. 17, 1937   2 Sheets-Sheet 1

Inventor
Edward Hering
By
Attorney

July 4, 1939.  E. HERING  2,165,051
FLEXIBLE PIPE JOINT
Filed Nov. 17, 1937  2 Sheets-Sheet 2
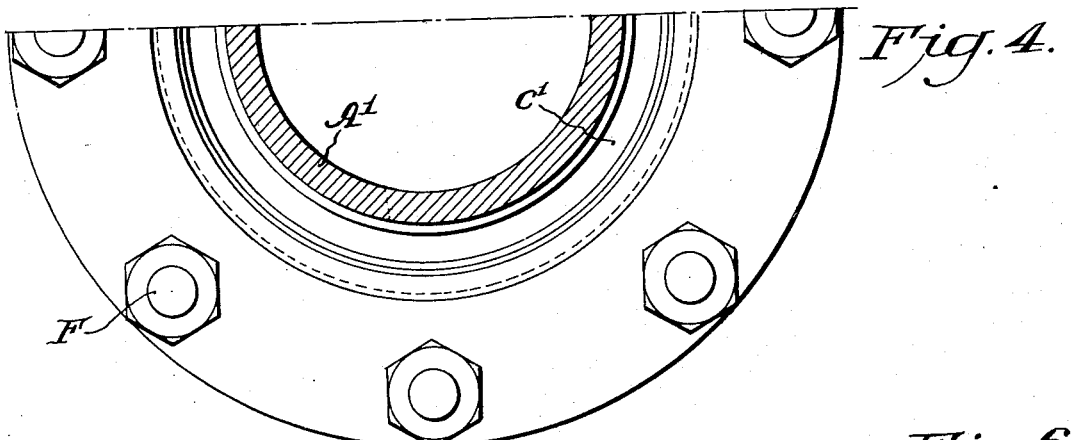
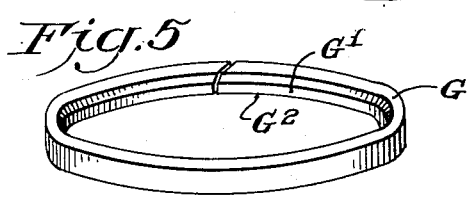
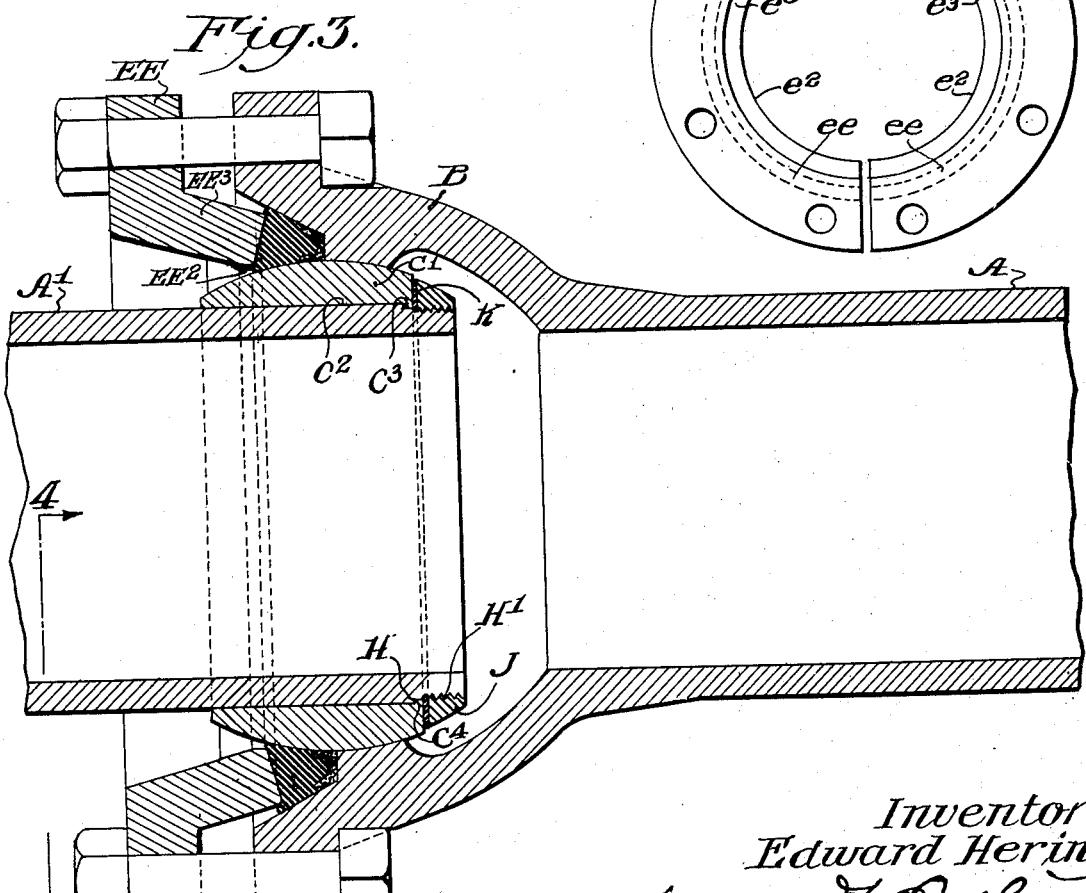
Inventor
Edward Hering,
By
Attorney Patented July 4, 1939

2,165,051

UNITED STATES PATENT OFFICE 2,165,051

FLEXIBLE PIPE JOINT

Edward Hering, Beverly, N. J., assignor to United States Pipe and Foundry Company, Burlington, N. J., a corporation of New Jersey Application November 17, 1937, Serial No. 174,952

2 Claims. (Cl. 285—91)

My invention relates to flexible pipe joints of the ball and socket type and has particularly in view the provision of a joint of this type which will not require such machining or grinding of the ball and socket members of the joint as has heretofore been found necessary and has added very greatly to the cost of such joints and a further object of my invention is to provide a construction which will not only be effective without machining or grinding contacting metal parts but will also permit under certain stresses a limited relatively longitudinal movement of coupled pipes without impairment to the tightness of the joint while at the same time maintaining pressure on the coupled portions tending to hold the ball in contact with its socket in the bell and to return it to such contact in case a separation occurs.

My improved joint comprises a bell end of the pipe having in its inner portion a socket seat for the ball end of another pipe, said seat having the form of a segment of a sphere of the same diameter as that of the ball to be seated thereon and said bell end being also formed to provide a packing chamber located so as to lie opposite to the outer portion of the ball member when seated in its socket in the bell. By preference the packing chamber terminates in an annular shoulder so located as to lie approximately opposite to the greater diameter of the ball when inserted in its socket and having its inner edge lying comparatively close to the ball. My joint further comprises the ball end of a pipe in which the ball may be either cast with or secured to the end of the pipe, the surface portions of the ball which are to contact with the socket in the bell and with the packing being surfaces of a sphere. A further element of my joint consists in a compressible and resilient packing located in the packing recess in the bell and extending over a portion of the outer surface of the ball so as to form for said outer portion of the ball a compressed and resilient spherical socket. A further element of my flexible joint is a gland member adapted to contact with the outer portion of the gasket and to compress a portion of it against the outer surface of the ball and, by preference, another portion of it against the outer wall of the packing chamber. The inner diameter of the gland member in my construction is sufficiently greater than the outer diameter of such portions of the pipe and ball as lie opposite to it in use so as to permit of an angular movement of the coupled pipes and the shape of the gasket in its inner portions must be such as to avoid direct contact with the outer portion of the ball and be separated therefrom by the portion of the gasket which is compressed against the ball. It will, of course, be understood that my joint construction also involves means for drawing and holding the gland into compressive contact with the gasket.

The essential novel feature of the construction described above lies in that it provides for the holding of the ball in operative contact with the socket in the bell and with a compressible and resilient socket formed by the gasket without bringing into contact with the outer surface of the ball any unyielding and uncompressible metallic surface, thereby making it possible, owing to the yielding and resilient character of the socket formed by the gasket for the parts to flex even when the contacting surfaces of the ball and socket members are not nicely finished as by machining and grinding.

My improved construction will be best understood as described in connection with the drawings in which Figure 1 is a longitudinal central section through my improved joint.

Figure 3 is a longitudinal central sectional view of a modification of my joint.

Figure 4 is a cross-sectional view taken on the line 4—4 of Fig. 3, looking in the direction of the arrows.

Figure 5 is an elevation on a reduced scale showing the construction of the split ring forming a part of the gland in the construction of Figs. 1 and 2, and Figure 6 is a perspective view on a reduced scale showing a modification in the construction of a gland adapted for use in Fig. 1.

Figure 1:
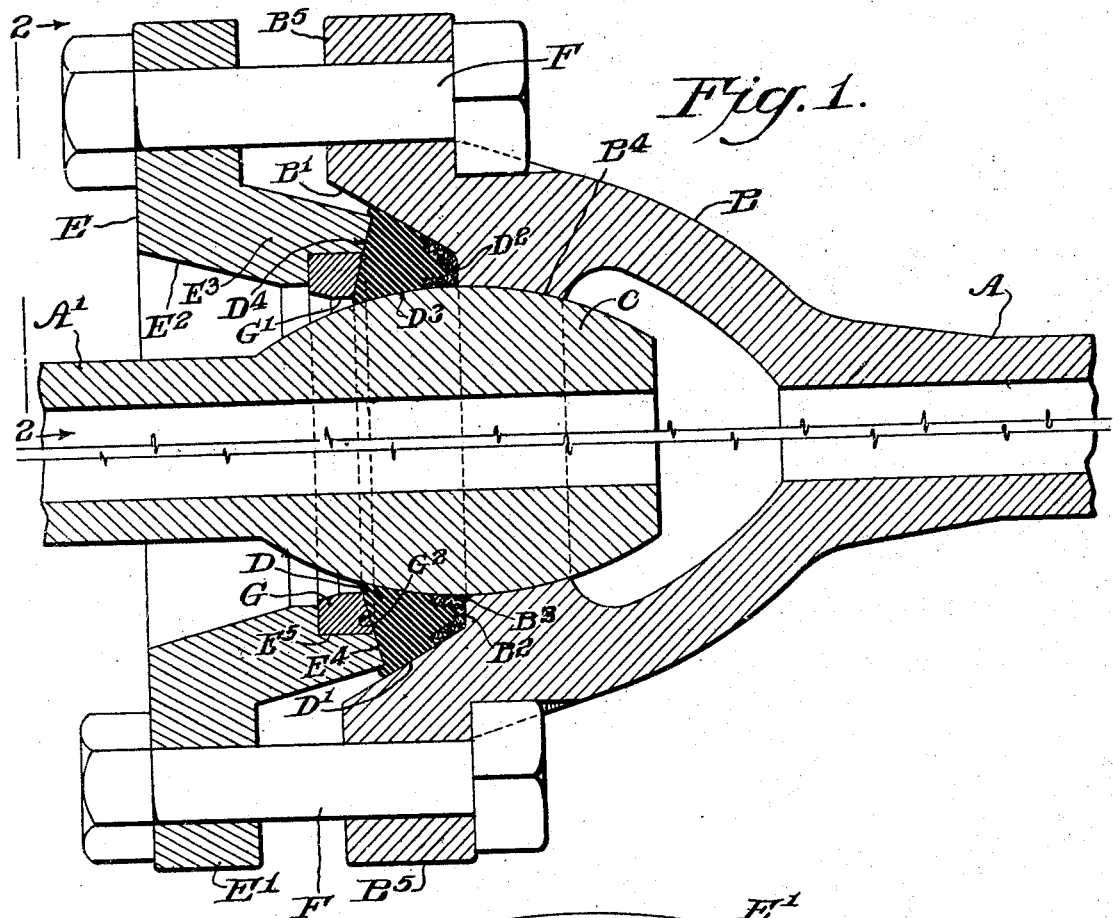
Figure 2:
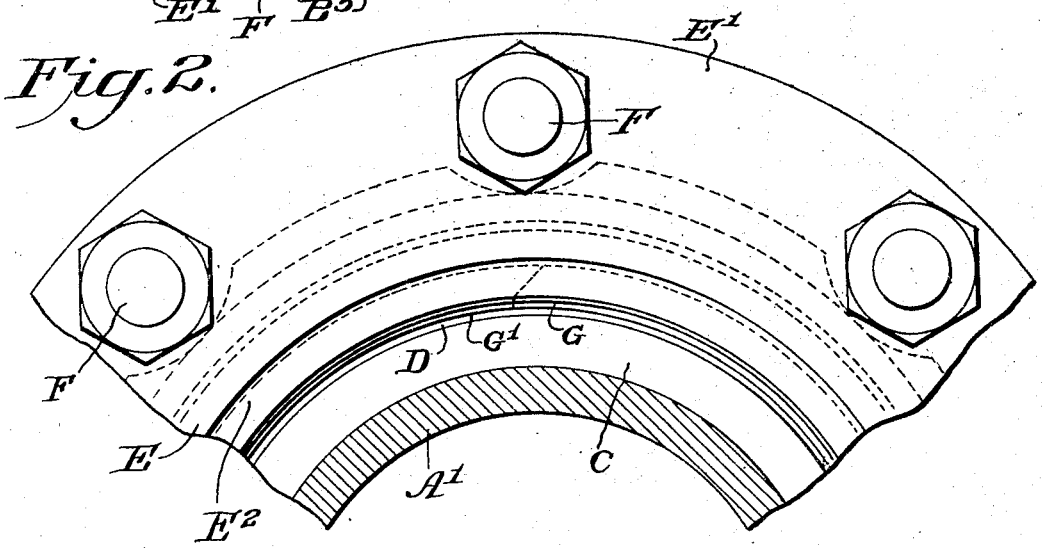
Figure 2 is a cross-sectional view taken on the line 2—2 of Fig. 1, looking in the direction of the arrows.

Referring to the construction shown in Figs. 1, 2, and 5, A indicates the end of a pipe on which is formed a bell as indicated at B. The outer portion of the bell is, as shown, preferably flared outward to form a packing chamber as indicated at $B^1$, said packing chamber ending at or about at the point at which the greater diameter of a ball to be inserted in the bell will be located, such shoulder being indicated at $B^2$ and having an inner edge indicated at $B^3$ which will come fairly close to the surface of the inserted ball at its greater diameter; located below this shoulder is a socket $B^4$ having the form of a spherical segment of a sphere similar to that formed by the contacting surface of the ball. $B^5$ is an outwardly extending flange formed at the end of the bell. $A^1$ is a pipe on the end of which is formed a ball, indicated at C, having the conformation of a sphere and adapted to rest upon the spherical seat $B^4$ and, when so located, to have its greater diameter in the plane of the shoulder $B^2$. D indicates a gasket of compressible and resilient material, such as rubber, the tapered outer surface of which, indicated at $D^1$, is adapted to rest against the flaring wall $B^1$ of the bell and the end $D^2$ of the gasket rests in contact with the shoulder $B^2$. The inner surface of the gasket, indicated at $D^3$, when the gasket is compressed, should fit against the outer portion of the ball C. As shown in the drawings, and by preference, this inner face of the gasket in its uncompressed condition should have its outer end of somewhat smaller internal diameter than the greater diameter of the ball so as to require some compression of the material of the gasket in forcing it in position over the ball which is preferably done before the ball is inserted in the bell and against its socket. $D^4$ indicates the outer or butt end of the gasket. E indicates an annular gland having an upwardly extending annular flange $E^1$ adapted to extend over the flange $B^5$ of the bell and to be drawn toward it as by means of bolts indicated at F. As shown in Figs. 1 and 2, the inner periphery of the gland E, indicated at $E^2$, is of somewhat greater diameter than the greater diameter of the ball so as to enable the gland to be placed in position on the pipe $A^1$ by slipping it over the ball. The gland is formed with a cylindrical extension, indicated at $E^3$, adapted to enter the mouth of the bell and contact with the butt end $D^4$ of the gasket. The face of the cylindrical extension indicated at $E^4$ is preferably made slightly conical, as shown, and at its inner edge is recessed, as indicated at $E^5$, to form a seat for a ring G, the inner periphery $G^1$ of which is of less diameter than the inner face of the gland, as indicated at $E^2$, and of less diameter than the greater diameter of the ball. The face $G^2$ of the ring when in place corresponds approximately with the face $D^4$ of the gland and forms practically a continuation of this conical face of the gland. In the make-up of my joint it is essential that the inner diameter of the gland E and of the ring G should be sufficiently greater than that of the pipe $A^1$ as to permit of the desired angular movement of this pipe $A^1$ with regard to the pipe A and it is of the essence of my invention that the parts involving my joint should be of such sizes and shapes that when the gasket is compressed into contact with the outer surface of the ball forming a compressed and resilient socket for this portion of the ball that no portion of the gland or of the ring forming part thereof should come in contact with the ball but should be separated therefrom by an intervening compressed section of the gasket.

It will be obvious that to enable the ring G to be inserted in the recess $E^5$ of the gland E that it should be capable of expansion to enable it to pass over the ball C. This is readily effected by sectioning the ring, and, in the preferential form, when the ring is of elastic material a single sectional cut, as indicated in Fig. 5, will enable the ring to be sprung over the ball and properly located on the gland.

As an alternative to the construction shown in Figs. 1 and 2, involving the use of an expansible ring G, the gland member may be constructed in two separable parts, as indicated in Fig. 6, on a reduced scale. In this construction, the gland is made in two parts, as indicated at ee and the inner face $e^2$ is made of less diameter than the maximum diameter of the ball C and the cylindrical extension of the gland indicated at $e^3$ is formed without the recess $E^5$ of the gland E and so that the end of the cylindrical portion of the gland which contacts with the gasket will have substantially the form of the end of the cylindrical portion of the gland E together with the contacting surface of the ring G.

In the construction illustrated in Figs. 3 and 4, the end of the pipe $A^1$ is formed with a shoulder H and with a threaded end portion of reduced diameter, as indicated at $H^1$, and the ball, indicated at $C^1$, is formed with a passage extending through it consisting of a cylindrical section indicated at $C^2$ of slightly greater diameter than that of the pipe $A^1$, merging into a cylindrical portion $C^3$ of slightly greater diameter than the threaded portion $H^1$ of the pipe. A shoulder $C^4$ connecting said cylindrical portions and being adapted to fit against the shoulder H on the pipe. This separable ball is assembled on the end of the pipe, as indicated in Fig. 3, and is secured thereto by a nut J, screwing on the threaded end $H^1$ of the pipe $A^1$, a washer K being used as shown in the drawing to prevent leakage between the ball and the pipe to which it is attached. The rest of the construction indicated in Figs. 3 and 4, is essentially similar to that shown in Figs. 1 and 2, except that the gland, here indicated at EE, has its internal diameter $EE^2$, smaller than that of the greater diameter of the ball and has the end of its cylindrical portion $EE^3$, formed without the recess $E^5$ and of a shape corresponding to that which in the gland E is made up of the cylindrical portion of the gland and of the surface expansion afforded by the ring G, this being permissible because obviously the gland can be slipped over the pipe $A^1$ before the ball is attached to it, although, of course, the gland E of Figs. 1 and 2, with its supplemental ring G, can be used with this construction if desired.

In assembling my joint, the annular gasket D which, at least in its inner portion, should preferentially be of less internal diameter than the greater diameter of the ball and which, by reason of this elastic compressibility, can be forced over the ball, if the construction shown in Figs. 1 and 2 is used, or placed on the pipe before the ball is attached to it or, if the construction shown in Figs. 3 and 4 is used it should be positioned on the pipe $A^1$ and this should also be done with the gland E or the gland EE, after which in case the gland E is used, expansible ring G should be inserted in the recess $E^5$. The ball is then introduced into the bell B and seated on its spherical seat $B^4$ and the gasket D is then inserted in the packing recess or chamber $B^1$ with its smaller end $D^2$ resting on or in proximity to the shoulder $B^2$. The inner end of the cylindrical portion $E^2$ of the gland E and of the ring G, when used, is then brought in contact with the butt end $D^4$ of the gasket and the gland is then forced inward in the bell as by means of the bolts F compressing the compressible and resilient gasket D both against the wall of the packing chamber and the outer surface of the ball, with the result that the inner portion of the gasket is bulged out, as indicated in Figs. 1 and 3, having the form of the outer surface of the ball and forming a compressed resilient seat for this portion of the ball and, as I have already pointed out, it is of the essence of my invention that the parts should be of such relative size and structure that no portion of the gland or of its supplemental ring G, when used, should contact with the ball but, on the contrary, should be separated from it by a compressed resilient section of the gasket as illustrated in the drawings. As a result of this construction the ball is held between its seat $B^4$ in the bell and a compressed resilient seat formed by the gasket D which resilient seat, by reason of its compressibility, will permit of a turning movement of the ball and, of course, of its connected pipe $A^1$ even when the surface of the ball and of its seat $B^4$ in the bell is not nicely machined and ground, thus enabling the joint to be constructed at much less cost than is involved where the ball is held between metallic seats contacting with both its inner and outer portions.

The resilient seat formed by the compressed gasket D will also permit of some longitudinal relative movement of the coupled pipes while at the same time constantly exerting pressure tending to seat the ball in its seat in the bell.

It will be obvious that where the walls of the packing chamber $B^1$ are inwardly tapered as shown and the gasket D formed with a corresponding taper that the tapered wall of the packing chamber in coaction with the pressure exerted by the end portion of the gland $E^3$, which is preferably conical shaped as indicated at $E^4$, will tend to force the upper portion of the gland inward into contact with the outer surface of the ball and permit the formation of the compressed resilient seat formed by the gasket over the outer surface of the ball.

Having now described my invention, what I claim as new and desire to secure by Letters Patent, is:

1. A flexible pipe joint of the ball and socket type comprising a bell having at its inner portion a socket in the form of a spherical segment to receive the end of the ball when inserted in the bell, said bell also having a packing chamber located to surround the outer portion of the ball, when said ball is in contact with the socket in the bell, a ball member located at the end of a pipe in contact with the spherical seat formed in the bell and held resiliently in said contact by a gasket of compressed resilient material located in the packing chamber of the bell and extending over the outer surface of the ball to a sufficient extent to form a resilient socket for said outer surface of the ball operative to hold said ball in contact with the socket located in the bell with resilient pressure, said compressed resilient gasket constituting under normal conditions the sole contacting element for the outer surface of the ball, a gland member contacting with the outer end portion of the gasket and adapted to compress and hold said gasket in compressed condition, the inner portion of which is of such diameter and shape as to be spaced from the ball and separated therefrom by a portion of the compressed resilient gasket and also of such internal diameter as will permit of the desired angular movement of the ball in its socket before contacting with the pipe to which the ball is attached and means for drawing and holding the gland to gasket compressing position.

2. A flexible pipe joint as called for in claim 1, in which the outer wall of the packing chamber is tapered inwardly and the gasket formed with a corresponding external taper.

EDWARD HERING.